(12) United States Patent
Momot

(10) Patent No.: US 9,511,650 B2
(45) Date of Patent: Dec. 6, 2016

(54) ADJUSTABLE OPACITY CONTROL BASED ON OPERATOR AND LIGHT SOURCE POSITION

(71) Applicant: Bob Momot, Calgary (CA)

(72) Inventor: Bob Momot, Calgary (CA)

( * ) Notice: Subject to any disclaimer, the term of this patent is extended or adjusted under 35 U.S.C. 154(b) by 0 days.

(21) Appl. No.: 14/583,808

(22) Filed: Dec. 29, 2014

(65) Prior Publication Data

US 2015/0273989 A1    Oct. 1, 2015

Related U.S. Application Data

(60) Provisional application No. 61/972,383, filed on Mar. 30, 2014.

(51) Int. Cl.
| | | |
|---|---|---|
| *B60J 3/04* | (2006.01) | |
| *G02F 1/13* | (2006.01) | |
| *G09G 3/36* | (2006.01) | |
| *G02F 1/133* | (2006.01) | |

(52) U.S. Cl.
CPC .............. *B60J 3/04* (2013.01); *G02F 1/13306* (2013.01); *G09G 3/36* (2013.01); *G02F 2001/13312* (2013.01); *G09G 2380/10* (2013.01)

(58) Field of Classification Search
CPC .......... B60J 3/04; G09G 3/36; G02F 1/13306; G02F 2001/13312
See application file for complete search history.

(56) References Cited

U.S. PATENT DOCUMENTS

| | | | |
|---|---|---|---|
| 3,744,878 A | * | 7/1973 | Kiemle ................. G02F 1/1333 349/110 |
| 4,815,822 A | | 3/1989 | Bramhall |
| 4,874,938 A | | 10/1989 | Chuang |
| 6,113,813 A | | 9/2000 | Goudjil |
| 6,384,982 B1 | | 5/2002 | Spitzer |
| 6,424,448 B1 | | 7/2002 | Levy |
| 6,493,128 B1 | | 12/2002 | Agrawal et al. |
| 6,557,995 B1 | | 5/2003 | Edwards |

(Continued)

FOREIGN PATENT DOCUMENTS

| | | |
|---|---|---|
| CA | 2019337 A1 | 12/1991 |
| CA | 2377828 A1 | 2/2002 |

(Continued)

*Primary Examiner* — Rodney Butler

(74) *Attorney, Agent, or Firm* — Leland Scott Paynter IP Law, LLC; Leland Scott Paynter

(57) ABSTRACT

A vehicle windshield includes a light passage control medium extending therealong. The medium responds to light source position to produce one or more opacity-controlled spots to at least partially block the light reaching a vehicle operator's/occupant's eyes. Optionally, an operator control may be adjusted by hand, foot, voice, or the like to adjust spot characteristics such as location, number, size, edge feathering, and the like. A detector to determine position of one or more vehicle operator eyes is also optional. The vehicle may be an on-road type like an automobile or truck, an off-road vehicle (such as dump truck, crane, backhoe, bulldozer, or cement truck), an aircraft (of the fixed wing and/or rotary wing type), a train (light or heavy rail, commuter or freight), any manner of racing vehicle or a motorcycle where a helmet worn by the operator includes the windshield and medium.

16 Claims, 11 Drawing Sheets

(56) References Cited

U.S. PATENT DOCUMENTS

| | | |
|---|---|---|
| 7,874,666 B2 | 1/2011 | Xu et al. |
| 7,970,172 B1 | 6/2011 | Hendrickson |
| 2004/0246437 A1 | 12/2004 | Ambler et al. |
| 2006/0140502 A1 | 6/2006 | Tseng et al. |
| 2010/0065721 A1* | 3/2010 | Broude ............ B60J 3/04 250/201.1 |
| 2011/0072961 A1 | 3/2011 | Jungkuist et al. |
| 2011/0233384 A1* | 9/2011 | Wu ................. B60J 3/04 250/208.2 |
| 2012/0019891 A1* | 1/2012 | Dewell ............ G02F 1/163 359/275 |
| 2012/0044560 A9 | 2/2012 | Lam et al. |
| 2012/0292488 A1 | 11/2012 | Saadat |
| 2012/0303214 A1* | 11/2012 | Yuter ............... B60J 3/04 701/36 |
| 2013/0313366 A1 | 11/2013 | Hoffa et al. |
| 2014/0055831 A1* | 2/2014 | Johnson ........... B60J 3/04 359/238 |
| 2014/0153076 A1* | 6/2014 | Tewari ............. B60J 3/04 359/238 |
| 2015/0077826 A1* | 3/2015 | Beckman .......... G02B 27/01 359/238 |

FOREIGN PATENT DOCUMENTS

| | | |
|---|---|---|
| CA | 2478315 A1 | 9/2004 |
| CA | 2723953 A1 | 10/2008 |

* cited by examiner

720
FIG. 7A
FIG. 7B
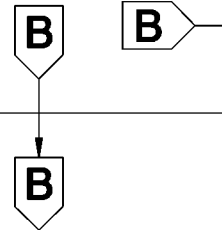
FIG. 7C
FIG. 7

ADJUSTABLE OPACITY CONTROL BASED ON OPERATOR AND LIGHT SOURCE POSITION

CROSS-REFERENCE TO RELATED APPLICATIONS

The present application claims the benefit of commonly owned U.S. Provisional Patent Application No. 61/972,383 to Momot filed 30 Mar. 2014 (the '383 Application), which is hereby incorporated by reference as if set forth herein in its entirety.

FIELD

The present application relates generally to optical devices; and more particularly, but not exclusively relates to techniques, systems, methods, apparatus, and devices for at least partially shading, adumbrating, darkening, reducing, abating, moderating, diminishing, curtailing, or blocking light in a location-selective fashion.

BACKGROUND

Various devices exist to reduce glare from sunlight or other sources of bright light. Reducing the glare can serve to protect the eyes of a user or otherwise improves the vision of the user when looking through an optical element. For example, users can wear sunglasses, shaded goggles, or other type of shaded eyewear. As another example, some motor vehicles are equipped with mirrors that have "dimming" capability to reduce the glare from headlights of other vehicles.

State-of-the-art schemes to reduce the adverse effects of bright sunlight while operating a vehicle or the like often focus on the use of sunglasses or similar eyewear to filter the sunlight. In some cases, an opaque vehicle visor is used to block the most offensive region of incoming sunlight, while in others a filtering visor might be used. In yet other examples, windows in a home might be fitted with shades or curtains to block out sunlight. Like some eyewear, windows have been proposed with photochromic substances that darken in response to certain wavelengths of light. Much like sunglasses, these schemes darken the entire viewable field of the window, and typically cannot be readily controlled.

Unfortunately, these approaches can block or impede visibility of other vehicles, pedestrians, and/or various objects that might pose a danger. Moreover, during nighttime travel, the lights of another vehicle can still pose a problem because sunglasses, visors, and the like are generally only suitable for daytime use. Indeed, existing schemes often can be cumbersome to use, and/or make it difficult to readily and consistently obtain a satisfactory result in certain instances. Accordingly, there remains an ongoing demand for further contributions in these technical arenas.

SUMMARY

Among the embodiments of the present application are unique techniques to control the light level reaching a vehicle occupant based on location of the corresponding light source. Other embodiments include unique devices, apparatus, methods, and systems to adjust location of light abatement along a windshield with respect to position of a vehicle occupant and location of the light source while leaving at least one other portion of the windshield generally transparent. In one nonlimiting aspect, the present application relates to controlling opacity of one or more selected locations in response to the position of one or more light sources for the benefit of an operator or rider of a vehicle and/or as otherwise may be beneficial.

Another embodiment includes: operating a vehicle with a windshield, a light passage control medium extending along at least a portion of the windshield, the light passage control medium being adjustable between a more opaque state and a more transparent state; sensing position of a light source external to the windshield with a detector; determining one or more locations on the light passage control medium corresponding to the position of a light source external to the windshield; in response to input from an operator input device, changing position of the one or more locations to one or more other locations; and adjusting the one or more locations from the more opaque state to the more transparent state and the one or more other locations from the more transparent state to the more opaque state.

Yet another embodiment includes: a vehicle with a windshield, a light passage control medium extending along at least a portion of the windshield, with the light passage control medium being adjustable between a more opaque state and a more transparent state. It further includes a means for sensing the position of a light source external to the windshield with a detector; means for determining one or more locations on the light passage control medium corresponding to the position of a light source external to the windshield; means for changing position of the one or more locations to one or more other locations in response to the determining means; and, means for adjusting the one or more locations from the more opaque state to the more transparent state and the one or more other locations from the more transparent state to the more opaque state.

In one other embodiment: a vehicle is included that has a windshield at least a portion of which has a curvature, and a light passage control medium extending along at least a portion of the curvature of the windshield. The light passage control medium includes means for adjusting between a more opaque state and a more transparent state. Also included are: means for sensing the position of a light source external to the windshield with a detector; means for selectively determining one or more locations on the light passage control medium in accordance with the position of the light source and one or more vehicle occupants; and, means for selectively adjusting the light passage control medium to the more opaque state to reduce light passage from the light source through the one or more locations while one or more other portions of the light control passage medium are in the more transparent state in response to the determining of the one or more locations.

In still another embodiment: a vehicle is included that has a windshield comprised of three or more panes, each of the panes being fixed to at least one other of the panes to define an interior angle therebetween of less than 180 degrees and define an exterior surface extending outward from an interior of the vehicle, and a light passage control medium carried with at least two of the panes. The light passage control medium includes means for adjusting locus between a more opaque state and a more transparent state. Also included are: means for sensing the position of a light source external to the windshield; means for selectively determining location of one or more spots along the light passage control medium in accordance with the position of the light source and one or more vehicle occupants; and, means for selectively providing the one or more spots in the more opaque state to reduce light passage from the light source therethrough while one or more other portions of the light passage control device are in the more transparent state.

A different embodiment comprises: operating a vehicle including a windshield comprised of three or more panes, the panes each being fixed to at least one other of the panes to define an interior angle therebetween of less than 180 degrees and define an exterior windshield surface extending outward from an interior of the vehicle; carrying a light passage control medium carried with at least two of the panes; selectively adjusting locus of the light passage control medium between a more opaque state and a more transparent state; sensing the position of a light source external to the windshield with a detector; determining location of one or more spots along the light passage control medium in accordance with the position of the light source and one or more vehicle occupants; and, selectively adjusting the one or more spots to the more opaque state to reduce light passage from the light source therethrough while one or more other portions of the light passage control medium are in the more transparent state.

A further embodiment comprises: operating a vehicle with a windshield at least a portion of which has a curvature, a light passage control medium extending along at least a portion of the curvature of the windshield, the light passage control medium being adjustable between a more opaque state and a more transparent state; sensing the position of a light source external to the windshield with a detector; selectively determining one or more locations on the light passage control medium in accordance with the position of the light source and one or more vehicle occupants; and in response to the determining of the one or more locations, selectively adjusting the light passage control medium to the more opaque state to reduce light passage from the light source through the one or more locations while one or more other portions of the light passage control device are in the more transparent state.

Still another embodiment includes: a vehicle with a windshield having a curved portion; a light passage control medium extending along at least the curved portion of the windshield, the light passage control medium being controllable to change opacity between a more transparent state and a more opaque state; a first detector to sense position of a light source external to the windshield; an operator control responsive to input from an operator of the vehicle; a second detector to sense location of one or more eyes of the operator; and a processing device responsive to the first detector and the second detector to execute operating logic to determine one or more spots along the light passage control medium, the processing device sending one or more signals to the light passage control medium to adjust the one or more spots from the more transparent state to the more opaque state to reduce passage of light from the light source to the one or more eyes of the operator.

Other features, aspects, forms, embodiments, applications, implementations, techniques, objects, benefits, advantages, options, and variations will become apparent from the description and figures provided herewith.

BRIEF DESCRIPTION OF THE DRAWING(S)

FIG. 3 includes section line 4-4 pertaining to the FIG. 4 view.

FIGS. 6 and 6A-6B represent a flowchart of one procedure to make, assemble, and use the system of FIGS. 1-3. FIG. 6 collectively shows the partial view of FIGS. 6A-6B in schematic form showing how they relate to one another.

Figure 7A:
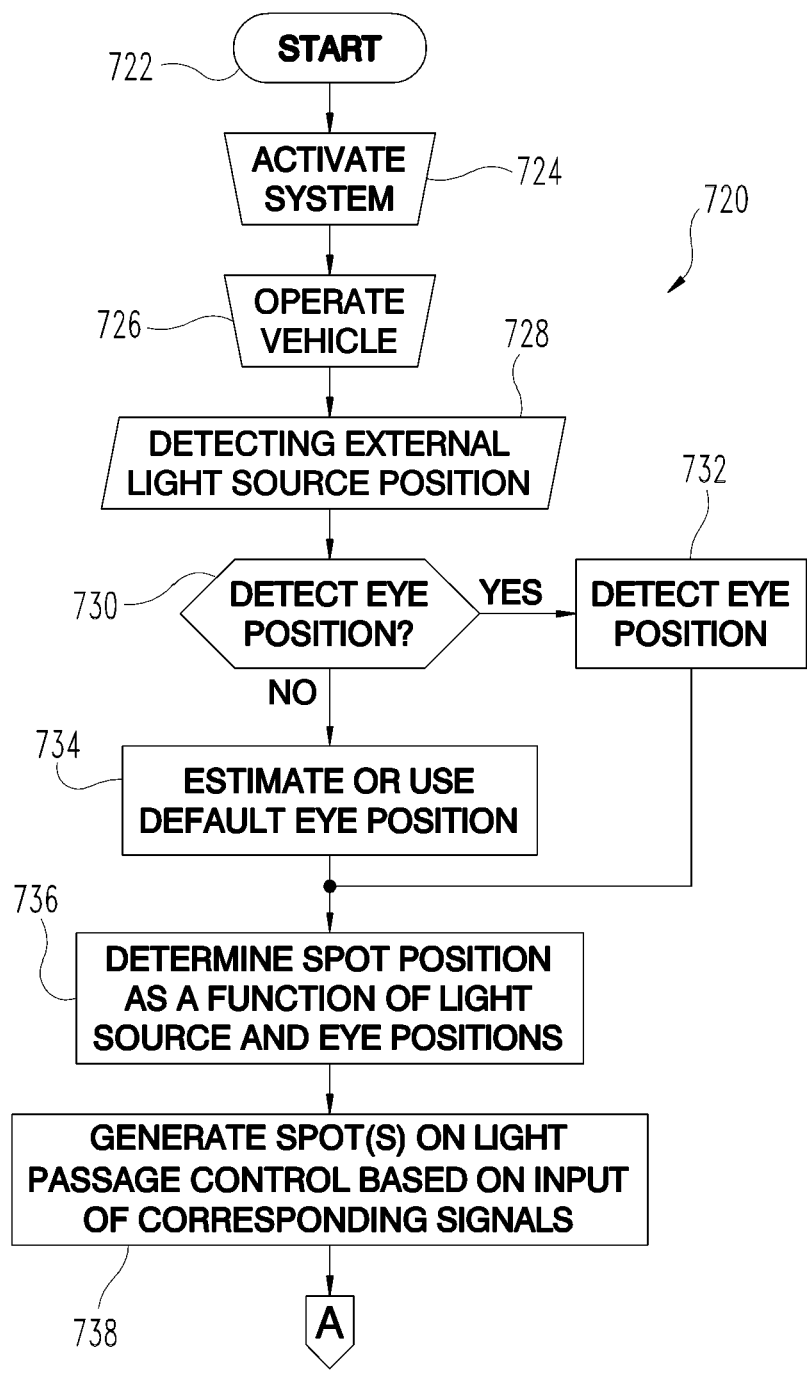
Figure 7B:
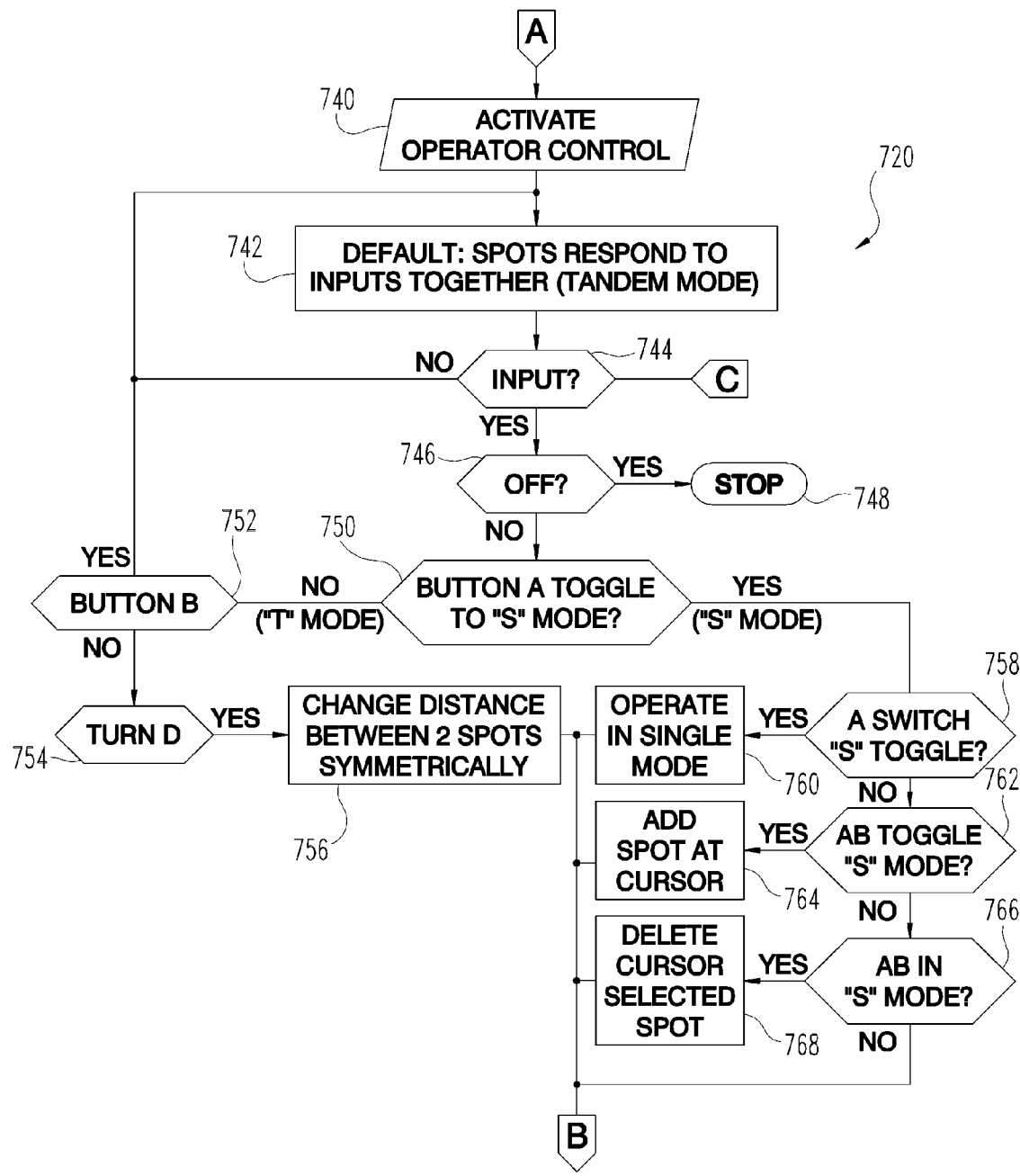
Figure 7C:
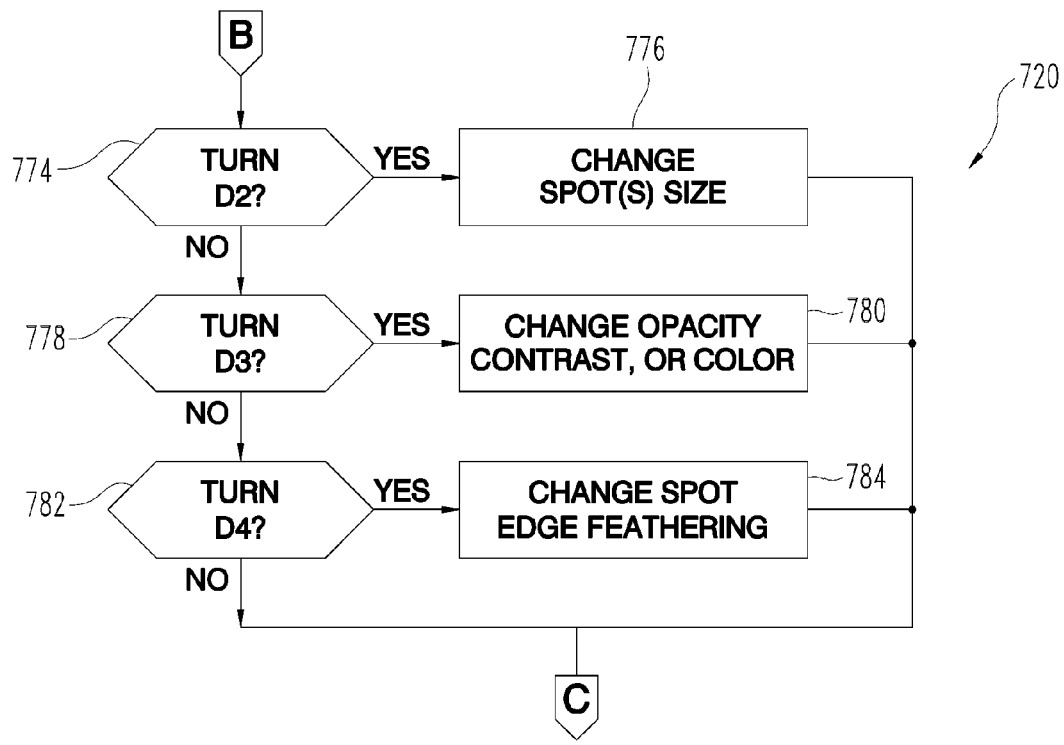

FIGS. 7 and 7A-7C set forth a flowchart comprised of three partial views in FIGS. 7A-7C on three separate sheets and a schematic representing all the partial views of FIGS. 7A-7C together in the view of FIG. 7 on the same sheet to indicate the manner in which they relate to one another.

Figure 8:
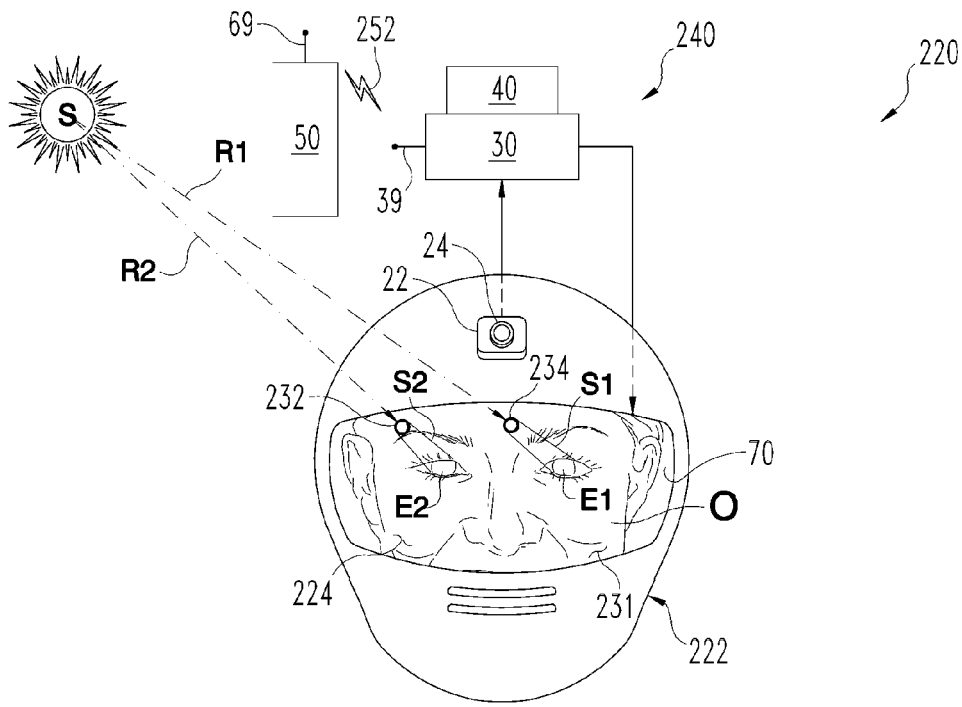

FIG. 8 is a partially diagrammatic view of another system with some features installed on or in a motorcycle helmet, including a light passage control medium installed on or embedded in the helmet facemask that demonstrates certain operative aspects of the present application.

Figure 1:
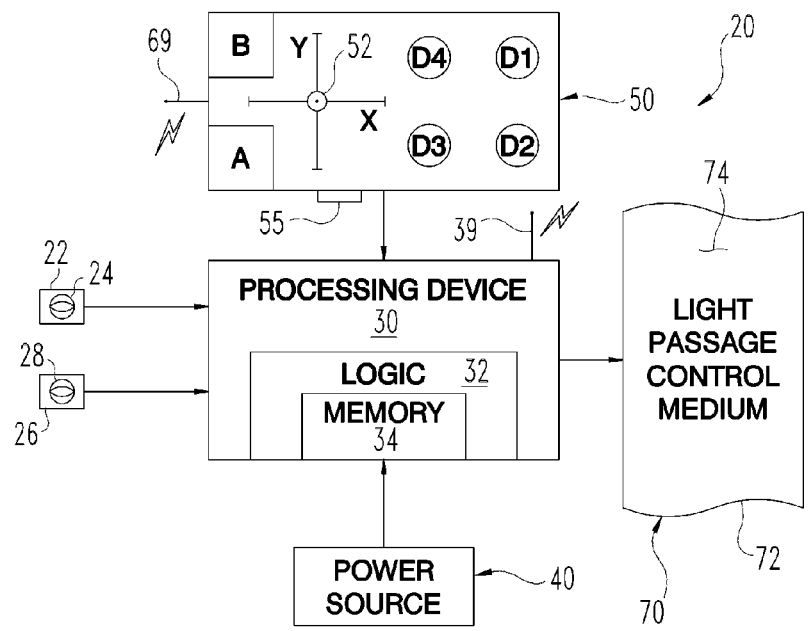
FIG. 1 is a partially diagrammatic view of a system of the present application.
Figure 9:
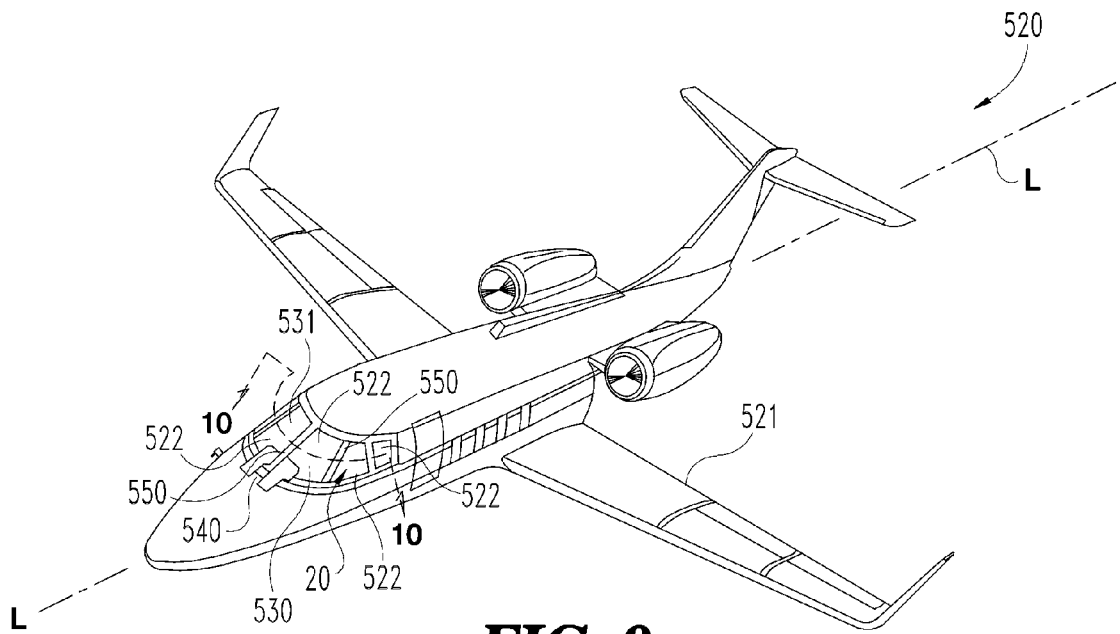

FIG. 9 is a partially diagrammatic, perspective view of the system of FIG. 1 installed with the light passage control medium fitted to a multiple panel windshield of a jet aircraft with a pressurized cabin and cockpit. FIG. 9 includes section line 10-10 pertaining to the FIG. 10 view.

Figure 10:
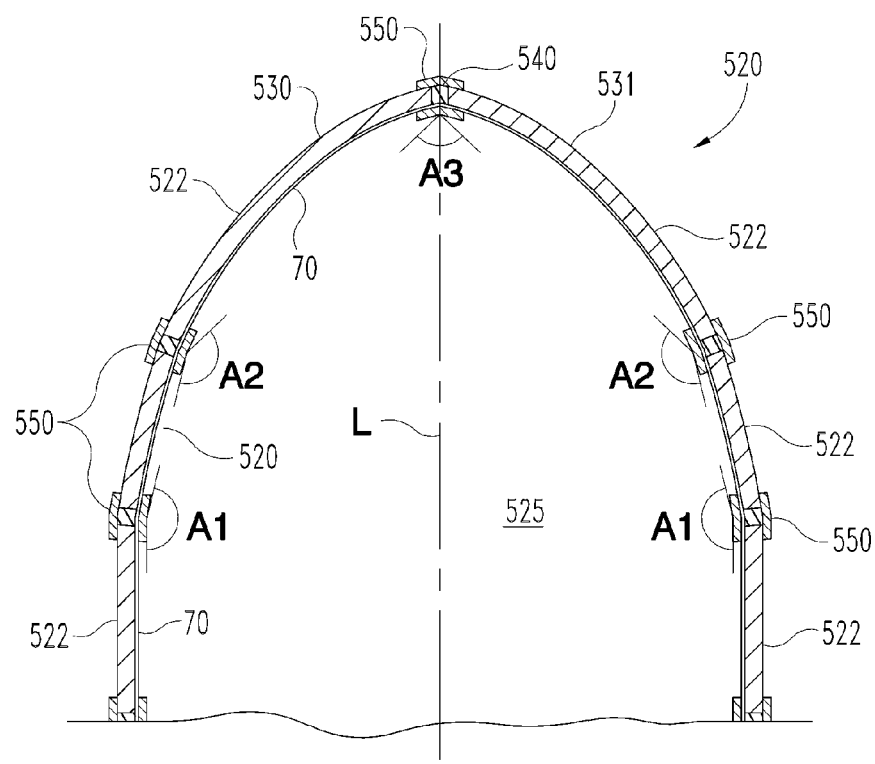

FIG. 10 is a partly diagrammatic, cross-sectional view of the windshield of the FIG. 12 aircraft to depict certain aspects thereof.

Figure 11:
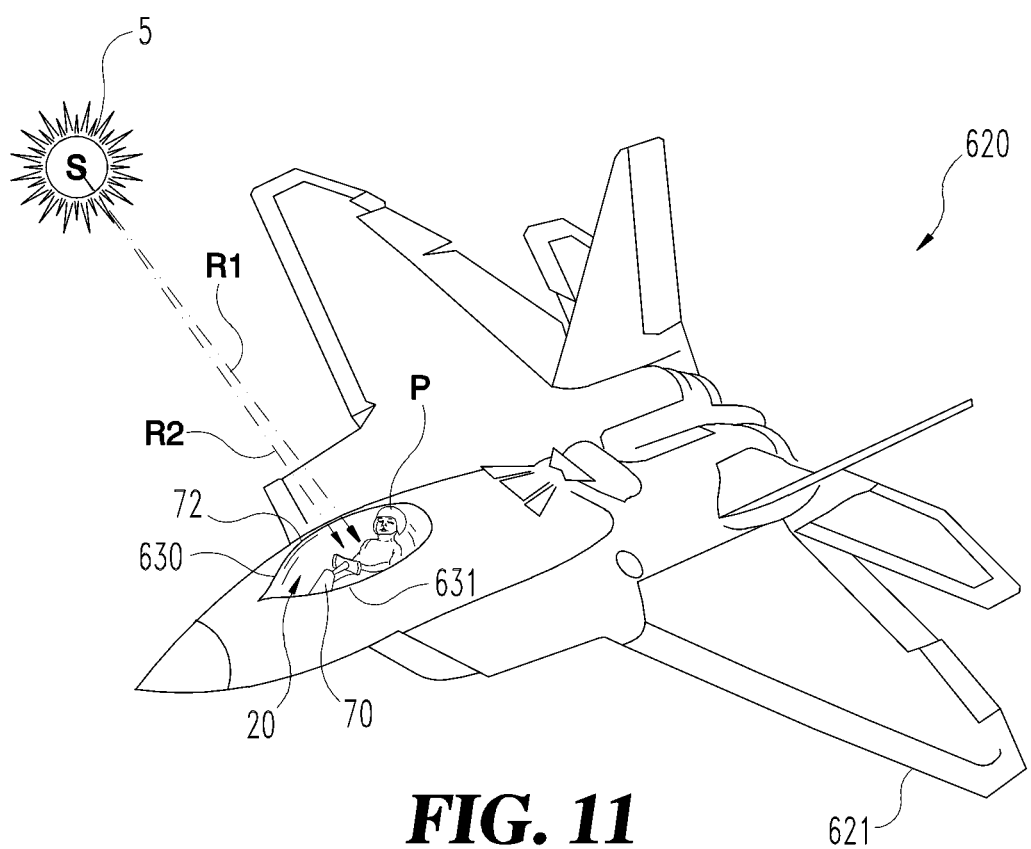

FIG. 11 is a partially diagrammatic view of a further aircraft with a bubble canopy including the system of FIG. 1.

DETAILED DESCRIPTION OF REPRESENTATIVE EMBODIMENTS

In the following description, numerous specific details are given to provide a thorough understanding of embodiments. One skilled in the relevant art will recognize, however, that the invention(s) of the present application can be practiced without one or more of the specific details, or with other methods, techniques, systems, devices, apparatus, components, materials, etc. In other instances, well-known structures, materials, or operations are not shown or described in detail to avoid obscuring aspects of the invention. Thus, for the purposes of promoting an understanding of the principles of any invention provided herein, reference will now be made to representative embodiments illustrated in the drawing(s) and specific language will be used to describe the same. It will nevertheless be understood that no limitation of the scope of any invention is thereby intended. Any alterations, variations, modifications and applications of the principles of the same as described herein are contemplated as would normally occur to one skilled in the art to which they relate. From the description and figures provided herein, it will be apparent that various modifications, alterations, variations, and substitutions may also be made without departing from the scope of the invention as set forth in the claims listed hereafter.

One embodiment of the present application is directed to: receiving a liquid crystal matrix layer for lamination, the liquid crystal matrix layer including a first surface opposite a second surface; laminating one or more see-through layers to the first surface of the liquid crystal matrix layer and at least one other see-through layer to the second opposing surface of the liquid crystal matrix layer to provide a laminate, the liquid crystal matrix layer being at least partially embedded in the laminate; including at least a portion of the laminate in one of: a windshield, a windshield pane, a windshield panel, and a windshield canopy; forming the one of the windshield, the windshield pane, the windshield panel, and the windshield canopy with a signal interface to the liquid crystal matrix layer in the laminate; testing operation of the liquid crystal matrix after the forming of the one of the windshield, the windshield pane, the windshield panel, and the windshield canopy with a test signal source operatively coupled to the interface; and providing the one of the windshield, the windshield pane, the windshield panel, and the windshield canopy for installation on an aircraft.

FIG. 1 depicts selective light control system 20 of another embodiment of the present application. System 20 includes detector 22 in the form of camera 24 to detect position of a light source 5 (See FIG. 2) and detector 26 in the form of camera 28 to detect eye position of an operator of system 20. System 20 further includes processing device 30 responsive to operating logic 32 defined in whole or in part by memory 34. Operating logic 32 may be comprised hardware, firmware, software, or a combination of these; and may be analog, digital, or both. Memory 34 may be of any type and may or may not define some or all of logic 32. Memory 34 may be volatile and/or nonvolatile of one or more different types.

Processing device 30 is operatively coupled to detectors 22, 26 and power source 40. Power source 40 provides electrical power to processing device 30 and detectors 22, 26 as needed to operate according to the operational description thereof. Operator control 50 and light passage control medium 70 are also operatively coupled to processing device 30 that are more fully described hereinafter. In one form, processing device 30 and control 50 are in wireless communication via symbolic antennas 39 and 69 to provide operative coupling.

Figure 2:
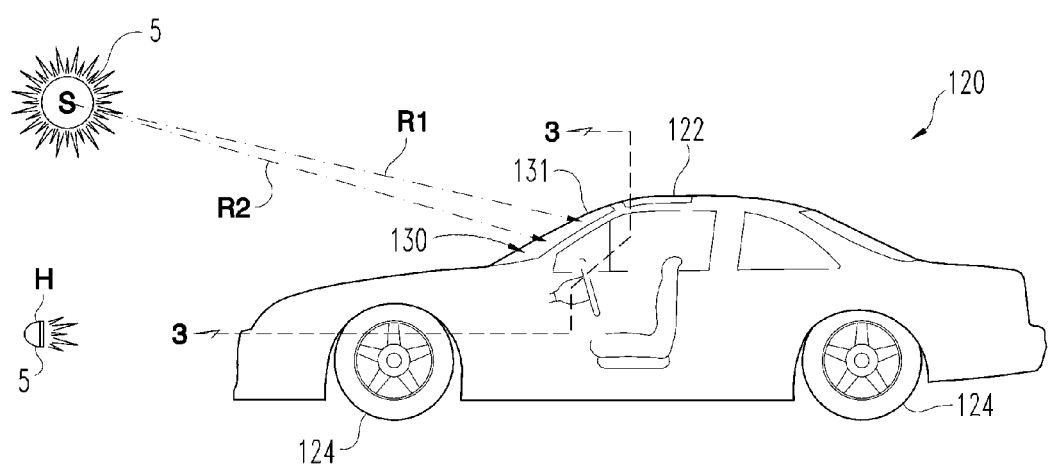
FIG. 2 is view of the system of FIG. 1 installed in an automobile with a section line 3-3 pertaining to the FIG. 3 view.
Figure 3:
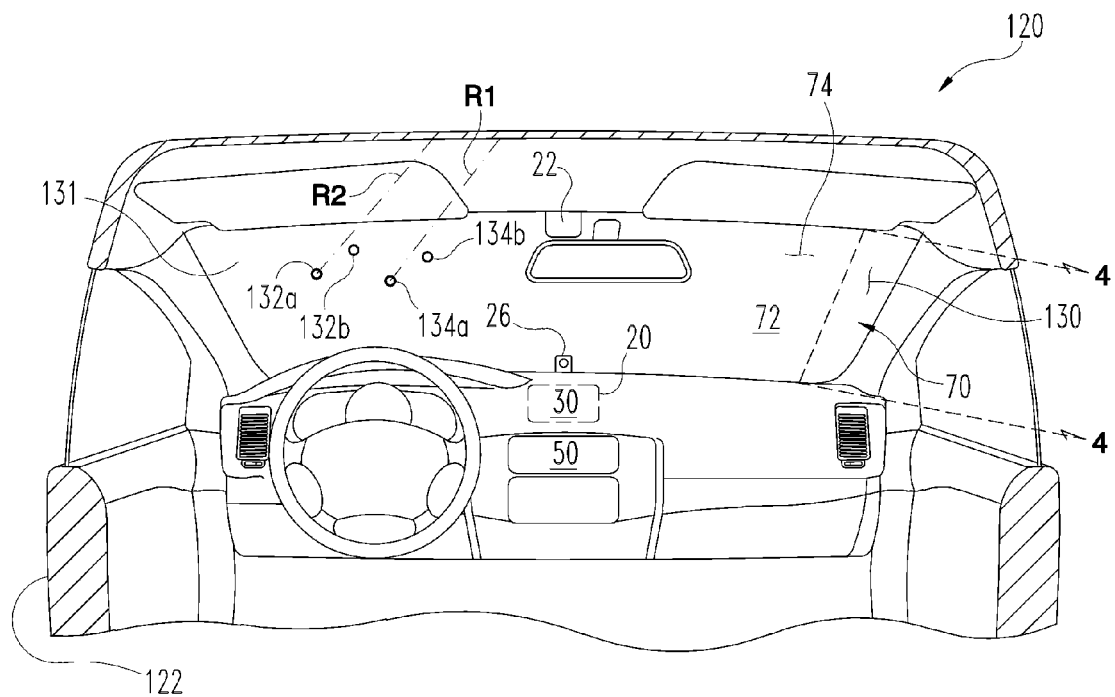
FIG. 3 is a partially diagrammatic view with schematic cross section and cutaway showing the FIG. 1 system installation from the automobile interior corresponding to the section line 3-3 of FIG. 2.

System 20 is incorporated in vehicle system 120 of FIGS. 2 and 3; where like reference numerals refer to like features previously described. System 120 includes vehicle 122 with ground engaging wheels 124. Vehicle 122 also includes windshield 130 with curvature symbolically represented by reference numeral 131. FIG. 2 shows light sources 5 in the form of Sun S, with rays R1 and R2 emanating therefrom, and one or more headlamps H positioned exterior to vehicle 122. FIG. 3 provides an interior view of vehicle 122 from the perspective of an occupant, such as a driver/operator, taken in partial cross-section along section line 3-3 of FIG. 2. As shown in FIG. 3, medium 70 is mounted on the interior of windshield 130 and extends along curvature 131 thereof. Medium 70 is in the form of an electrically-controlled liquid crystal matrix 72. Liquid Crystal Display (LCD) 74 type that is clear when inactivated is the specific form of matrix 72. Matrix 72/LCD 74 is configured to provide an individually addressable pixelated control over which portion(s) are more opaque relative to the more transparent, generally see-through property thereof when not activated.

Figure 4:
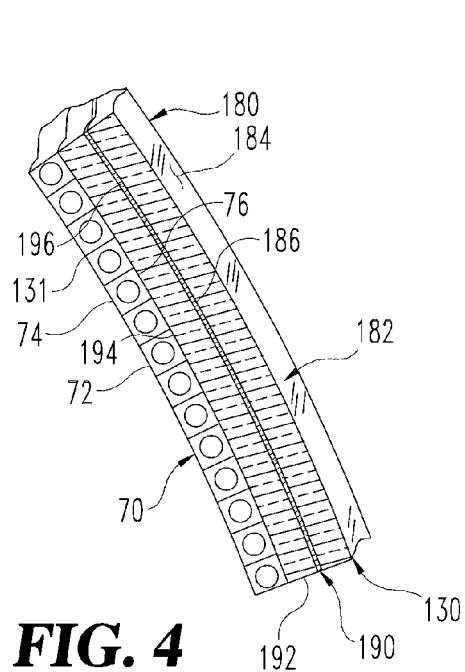
FIG. 4 is another partially diagrammatic, cross-sectional view of a portion of the windshield of automobile vehicle of FIGS. 2-3 that corresponds to section line 4-4 of FIG. 3.
Figure 5:
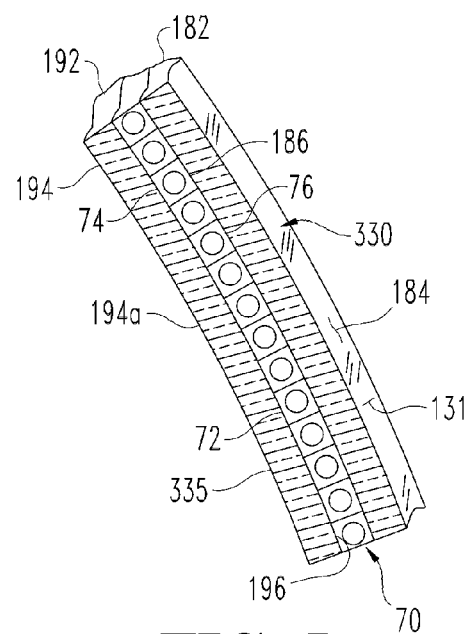
FIG. 5 is a diagrammatic view of another system of the present application in which the light passage control medium is laminated between two layers of see-through material.

FIGS. 4 and 5 illustrate alternative forms of a cross section of windshield 130; where like reference numerals refer to like features previously described. FIG. 4 depicts window laminated assembly 180 of windshield 130 with curvature 131. As exemplified by assembly 180, windshield 130 comprised of outer see-through layer 182 in the form of glass or a synthetic polymer. Layer 182 includes outer side 184 opposite inner side 186. Assembly 180 further includes inner see-through layer 192 with more inward surface 194 opposite more outward surface 196. Layer 192 may be composed in the same manner as layer 182. In between, layers 182 and 192 is a see-through polymer layer 190, such as certain types of polyvinyl butyral (PVB) or the like, that is added to reduce separation of portions of assembly 180 in the event of fracture, breakage, or the like. For assembly 180, medium 70 is laminated along inward surface 194 of layer 192, following the curvature thereof.

FIG. 5 illustrates assembly 330 that embeds medium 70 between layers 182 and 192. In assembly 330, medium 70 is embedded in lamination 335 in place of layer 190 formed of PVB or the like, and correspondingly medium 70 includes like properties to provide similar construction as the safety glass configuration of assembly 180. Alternatively, layer 190 is included along with medium 70 on one or both sides to provide the desired safety glass lamination 335 (not shown).

Figure 6A:
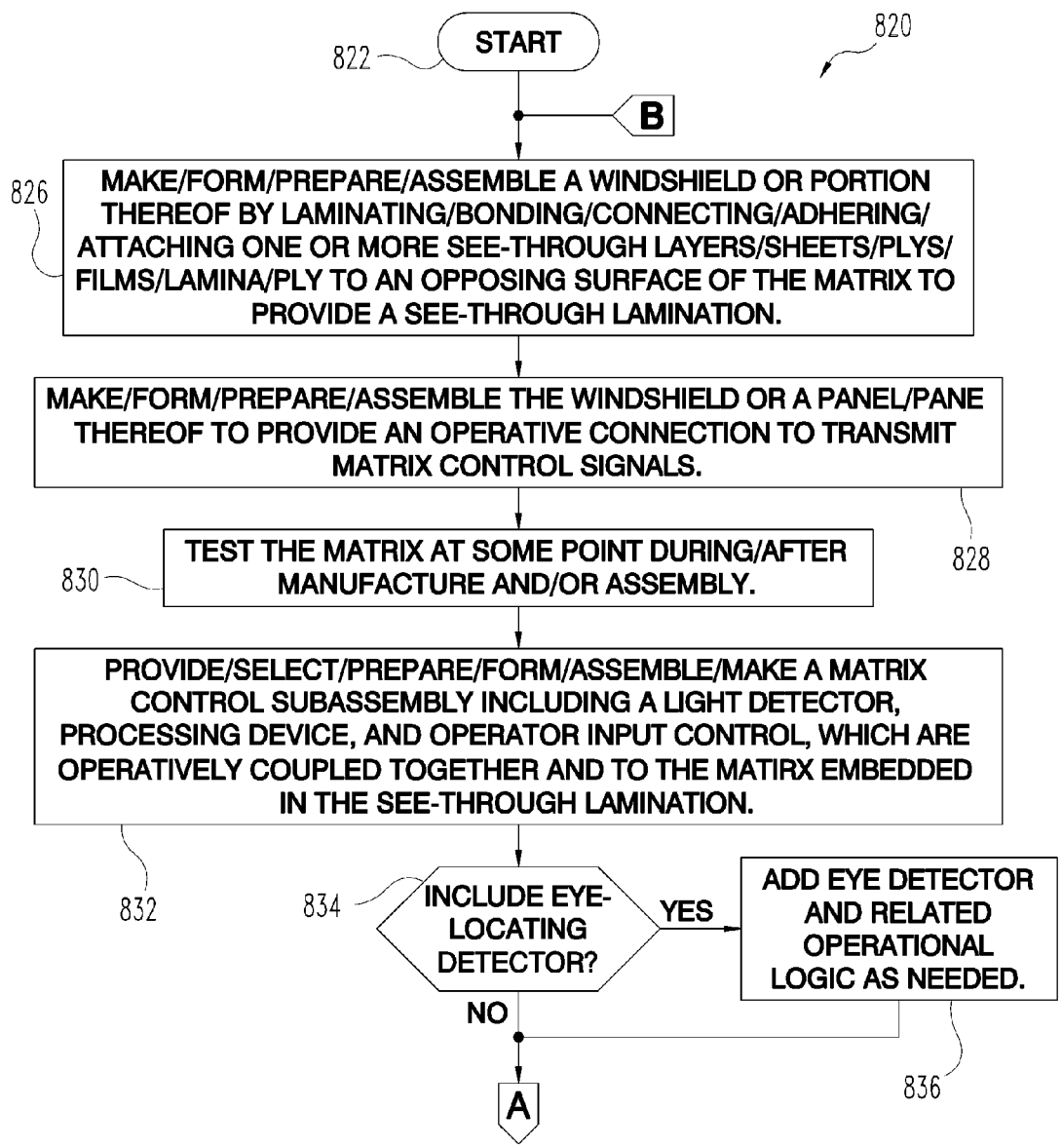
Figure 6B:
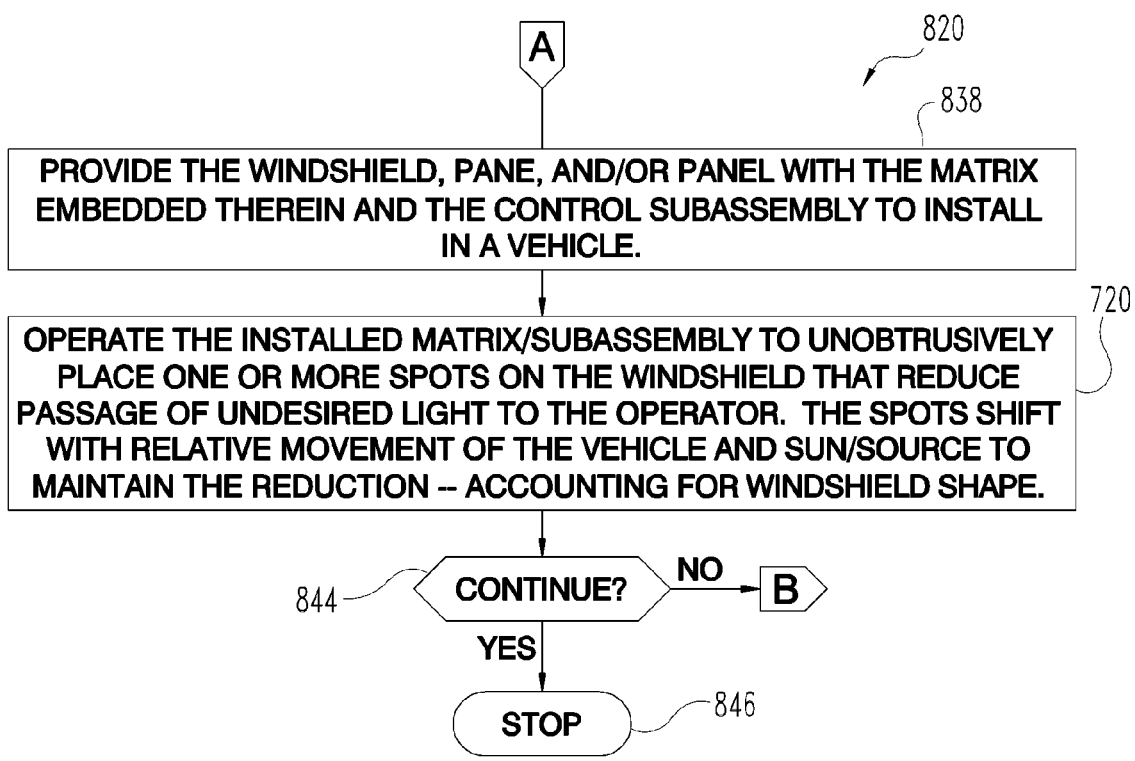

FIG. 6 depicts a flowchart of one process for making and using system 20 in vehicle 122; where like reference numerals refer to like features previously described. FIG. 6 represents partial views FIGS. 6A-6B of procedure 820, showing how the partial views relate to each other. Procedure 820 starts with stage 822 on the partial view of FIG. 6A. From stage 822, procedure 820 continues with operation 826. In operation 826, windshield 130 is assembled with medium 70 by lamination to the interior side of windshield 130 as illustrated in assembly 180 of FIG. 4 or medium 70 is embedded between layers comprising windshield 130 as provided in assembly 330 of FIG. 5. The result is a see-through lamination under ordinary operating conditions without medium 70/matrix 72 activated. Activation of medium 70/matrix 72 is further described hereinafter.

From operation 826, procedure 820 proceeds to operation 828. In operation 828, windshield 130 formation is further continued providing for connections or other mechanism to interface medium 70 with control aspects of system 20. Operation 828 may involve the extension of wires/cables from a portion of windshield 130. Procedure 820 continues with operation 830. In operation 830, the windshield assembly is interfaced to medium 70, and is tested to verify proper performance. From operation 830, procedure 820 continues with operation 832. Operation 832 provides for the supply of other aspects of system 20 to prepare for installation in a vehicle, including in such a kit comprising: control 50, processing device 30, detector 22, and the like. Even so, in other embodiments, there may be no explicit/separate kitting of system 20 components.

From operation 832, conditional 834 is next encountered. Conditional 834 tests if there is a second detector 26 of the type previously described. If the test of conditional 834 is affirmative (Yes), then procedure 820 proceeds to operational 836 to add the respective detector 66/camera 28 to the kit prepared in operation 832. If the test of conditional 834 is negative (No), the procedure 820 continues with operation 838. In the absence of detector 66/camera 28, there are several ways to estimate or input the same or similar information as will be further described hereinafter. In operation 838, the windshield 130 is installed in the vehicle 121 along with the balance of system 20, and may be tested further before proceeding to the next operation.

From operation 838, procedure 820 advances to procedure 720. In procedure 720, operation of system 20 as installed in vehicle 122 is performed. Operation 720 is further described in connection with FIG. 7 and FIGS. 7A-7C. However, before further description of procedure 720, the balance of procedure 820 is described. From procedure 720, procedure 820 encounters conditional 844, which tests if procedure 820 is to continue. If the test of conditional 844 is affirmative (Yes), then procedure 820 loops back to operation 826 to re-perform various operations and conditionals as warranted by the controlling logic of procedure 820. If the test of conditional 844 is negative (No), procedure 820 halts in stage 846.

FIG. 7 and FIGS. 7A-7C further described procedure 720; where like reference numerals refer to like features previously described. FIG. 7 collectively shows the partial views of FIGS. 7A-7C, indicating the relationship from one to the next. Turning to FIG. 7A, procedure 720 starts with external inputs 724 and 726 in which system 20 is activated along with vehicle 122. From these inputs, procedure 720 continues with input 728 in which the position of a light source external to vehicle 122/windshield 130 is determined with detector 22/camera 24. From input 728, conditional 730 is next encountered. Conditional 730 tests whether there is separate eye detection equipment (such as detector 26/camera 28 of system 20). If the test of conditional 730 is affirmative (Yes), then procedure 720 continues with operation 732. In operation 732, eye detection is performed with detector 26/camera 28 using standard techniques. After performance of operation 732, it bypasses operation 734, continuing with operation 736.

If the test of conditional 730 is negative (No), then procedure 720 falls through to operation 734. In operation 734, eye position is estimated and/or determined to be in a default position, such as the last position used when operative last. Estimation can be performed with expert learning systems, and initial training period, and/or using certain inputs with control 50 as will be further described hereinafter—just to name a few examples. From operation 734 or operation 732, procedure 720 continues with operation 736. Operation 736 determines where to position a pair of spots of darker opacity along matrix 72 to block or at least substantially reduce the amount of light from a light source external to vehicle 121. Operation 736 is performed as a function of light source 5 position and eye position, while accounting for any curvature of windshield 130 along which medium 70 is place. These spots can be formed by increasing opacity of liquid crystal matrix 72 via processing device 30 and detector 22 from which the position of sun S and the curvature of windshield 130 is accounted by a mapping, mathematical relationships, a look-up data table, or a combination of these—to name just a few examples.

From operation 736, procedure 720 continues with operation 738. In operation 738, spots are generated by increasing opacity of liquid crystal matrix 72 of LCD 74 in accordance with the determination of operation 736. Referring additionally to FIGS. 2 and 3, sun S could be one such light source 5 from which rays R1 and R2 represent solar light striking an operator of vehicle 121. In another example, headlamps H are another form of light source 5 that may be processed according to operations 736 and 738. As best shown in FIG. 2, example sun-reducing/blocking spots 132*a* and 134*a* are shown.

From operation 738, in FIG. 7B procedure 720 responds to operator activation of operator control 50 in input operation 740 by pressing power button 55 (a toggle type). With activation of operation 740, joystick 52 is operable anytime, which moves spots 134*a* in tandem for a Tandem mode (T mode) of operation or separately based on a joystick 52 directed cursor (such as an arrow, crosshairs, or the like) in a Separation mode (S mode) of operation. Selection between T mode and S mode depends on other inputs of control 50 to be described hereinafter. Regarding the detailed operation of control 50 until deactivated to return to conditional 844 of procedure 820 via stop stage 748. For T mode operation, joystick 52 controls movement of the spots 132*a* and 134*a* together without the need for a cursor. Spots 132*b* and 134*b* represent a different spot position that might be reached by movement with joystick 52 relative to spots 132*a* and 134*a*. From operation 740, procedure 720 encounters operation 742. Operation 742 sets spots 132*a* and 134*a* in a default position based on prior operations, either as an estimate or input of eye position or through determination with detector 26 if present. Further, spots 132*a* and 134*a* are configured to power-up in T mode per operation 742. From operation 742, conditional 744 is reached. Conditional 744 tests whether an input from control 50 has been received. If the test is negative (No), then control loops back to repeat operation 742. If the test is affirmative (Yes), then procedure 720 advances to conditional 746.

Conditional 746 tests if the control 50 is to be deactivated or turned off via toggle operation of power button 55. If the test of conditional 746 is affirmative (Yes), then stage 748 is reached, returning to procedure 820. If the test of conditional 746 is negative (No), conditional 750 is next encountered. Toggling between T mode and S mode is performed by pressing press button A of control 50. Conditional 750 tests if button A of control 50 has been pressed. If the test is negative (No), the default T mode is in effect and conditional 752 is next encountered to determine the toggle state of press button B of control 50. If the test of conditional 750 is affirmative (Yes), then conditional 758 is reached. Returning first to conditional 752, when button B is pressed during the T mode (affirmative—Yes), then control re control returns to operation 742. If button B is not pressed, then conditional 754 is reached. In one arrangement, it should be appreciated that when procedure 720 returns to operation 742 from conditional 752, it may have the effect of updating the default parameters of operation 742 with whatever is in effect at the time. In conditional 754, dial D1 is tested to determine if it has been rotated. If it has, control advances to operation 756 to change separation distance between the spots symmetrically in T mode from a merger condition at one extreme (one elongate spot) to a predetermined maximally separated condition.

From operation 756 (FIG. 7C), conditional 774 is next encountered that tests for rotation of dial D2. If it has, then spot size is changed in proportion to the rotation in operation 776 and control returns to input conditional 744 to test for further input. If conditional 774 is negative, then conditional 778 is next encountered to test for rotation of dial D3. If dial D3 has been turned, then a corresponding change occurs in at least one of opacity, contrast and color of the spot(s) (to the extent color is an option) in operation 780. If conditional 778 is negative (No), then conditional 782 is reached by procedure 720. Conditional 782 tests whether dial D4 has been turned. If it has, then edge feathering is adjusted for the spot(s). For operations in the range 776-784, both spots are effected when in T mode and only one spot is effected, as selected with the joystick controlled cursor if in S mode. Control of procedure 720 returns from these operations and conditional 782 (if negative) to the input conditional 744 (FIG. 7B).

Returning to conditional 750, if the test of button A is toggled to correspond to the separated, S mode; then procedure 720 proceeds to conditional 758. Conditional 758 tests if the control status is already in S mode, and if not, changes it to S mode in operation 760 (a form of S mode flag). Procedure 720 then advances to conditionals/operations in the range 774-784 previously described. If conditional 758 is negative, then procedure 720 continues with conditional 762. Conditional 762 tests if both buttons A and B (AB) are both pushed at the same time while in S mode (Yes), then a spot is added at the cursor as positioned with joystick 52. If the test of conditional 762 is negative (No), conditional 766 next tests if AB has the opposite toggle state of that tested in conditional 762. If so (Yes), then any spot selected by the joystick 52 controlled cursor is deleted. In other words, collectively, the range of conditionals and operations 762-768 provides for the ability to add or delete a spot as determined with position of the cursor controlled by joystick 52. Like operations 760. 764, and 768; a negative status of conditional 766 advances to the conditionals/operations of the range 774-784 before returning to conditional 744 to test for further input (including an off state of control 50 as would be accomplished by toggling button 55 such that conditional 746 is true).

FIG. 8 depicts a helmet 222 arrangement 220 that can incorporate system 20; where like reference numerals refer to like features previously described. Helmet 222 includes a curved clear, see-through faceplate 224 with curvature 231. Operator O is shown wearing helmet 222. Device 30 and power supply 40 are shown as part of helmet 222 with a wireless link to control 50 with antennas 39 and 69. Control 50 may be mounted on a motorcycle or other vehicle for which helmet 222 is typically worn. In a further embodiment, control 50 is mounted on the helmet 222 and hardwired to provide the desired functions. Spots 232 and 234 are illustrated as formed with a medium 70/matrix 72 mounted along the curved inner surface of faceplate 224. It should be appreciated that as in the case of an automobile application, the use of spots 232 and 234 do not tend to hamper vision as much as more fully tinted faceplate 224 can.

FIGS. 9 and 10 refer to a jet-powered, fixed wing aircraft 520 form of vehicle 521 that incorporates system 20 therein. Aircraft 520 is displayed in perspective along longitudinal axis L. FIG. 9 includes section line 10-10 which corresponds to the cockpit 525 cross-section shown in FIG. 10. Cockpit 525 includes windshield 530 that is comprised of a number of panes 522 symmetrically oriented about longitudinal axis L. Dividers 550 connect adjacent panes 522 in an approximately fixed relationship—although pressure and temperature changes may slightly alter the same. Panes 522 exhibit different degrees of curvature and collectively form a type of polygonal curvature given that each angle A1, A2, A3 is less than 180 degrees. This shape is known as polygonal convexity and approximates the overall curvature of windshield 530. Panes 522 exhibiting the greatest degree of intrinsic curvature are closest to the nose 540. For a high-speed, pressurized cockpit form of aircraft 521, windshield 530 is typically comprised of several layers of different transparent materials with defrosting circuitry or the like embedded between layers (not shown to avoid obscuring various features). Likewise, while medium/liquid crystal matrix 72 is shown mounted to curve along the interior of windshield 530; however, it may alternatively be embedded between layers to collectively comprising a see-through lamination (not shown), but see FIG. 5 assembly 330.

FIG. 11 displays aircraft 620 in the form of fixed wing airborne vehicle 621; where like reference numerals refer to like features. Aircraft 620 includes system 20 incorporated therein with medium 70/matrix 72 mounted on the inside of or embedded in vehicle bubble canopy windshield 630. Windshield 630 has complex curvature along which matrix 72 is mounted or alternatively embedded therein. Spots generated in response to light source 5 in the form of sun S are not shown to avoid obscuring certain features. Pilot P is shown through see-through canopy windshield 630 in the cockpit of aircraft 620. It should be appreciated that a Heads-Up Display (HUD) may be incorporated into matrix 72/medium 70.

In other embodiments, it should be appreciated that the described system has at least equal application with the canopy of a rotary wing aircraft, such as a helicopter. Besides both fixed and rotary wing aircraft forms of vehicles, the various features of the present invention find application in a variety of other vehicle types, such as trains, boat windscreen/canopy configurations, race car canopies, and the like—just to name a few more examples.

Any theory, thesis, hypothesis, mechanism of operation, proof, example, speculation, or finding stated herein is meant to further enhance understanding of one or more of the claimed inventions and is not intended to make any claimed invention in any way dependent upon or limited to such theory, thesis, hypothesis, mechanism of operation, proof, example, speculation, and/or finding. Furthermore, reference throughout the present application to "one embodiment" or "an embodiment" means that a particular feature, structure, or characteristic described in connection with the embodiment is included in at least one embodiment. Thus, the appearances of the phrases "in one embodiment" or "in an embodiment" in various places throughout the present application are not necessarily all referring to the same embodiment. Furthermore, the particular features, structures, or characteristics may be combined in any suitable manner in one or more embodiments. It should be understood that any use of the words "important, critical, crucial, significant, essential, salient, imperative, substantial, extraordinary, favor, favored, favorably, favorable, desire, desired, desirable, desirably, prefer, preferable, preferably, preference, and preferred" as modifiers in the description above indicates that the feature so described may be desirable, and further may be used to indicate different degrees of desirability among different features; however, any such feature(s) is nonetheless not to be incorporated or otherwise required in any of the claims set forth hereinafter unless expressly described therein and further such features do not preclude the existence of embodiments of the present invention/application lacking the same. In any method claim that follows, there is no intent that a particular order or sequence be imposed on any steps, strides, stages, phases, modes, parts, facets, states, positions, junctures, aspects, conditions, conditionals, divisions, recitations, gerundial statements, nongerundial statements, operations, functions, developments, motions, movements, practices, happenings, responses, formations, compositions, utilizations, determinations, executions, routines, progressions, procedures, processes, preparations, exploits, doings, deeds, achievements, arrangements, creations, events, implementations, applications, acts, and/or actions; or the like recited therein, irrespective of the use of an indefinite or definite article with a claimed feature; except to the extent performance of a claimed feature requires performance of another claimed feature before or after to make sense of the same in view of the applicable technical field(s); or unless an order or sequence is expressly recited in the claim. There is no intent that a given feature of a claim be interpreted as a means or step for performing a specified function unless expressly indicated by recitation of the language "means for . . . " or "step for . . . " respectively. While representative embodiments have been illustrated in the drawing(s) and described in detail in the foregoing description under the section headings: Abstract, Field, Background, Summary, Brief Description of the Drawing(s), Detailed Description of Representative Embodiments, and/or Experimental Example(s); it should be understood that the headings provided herein are for convenience only and do not interpret, define, limit, or otherwise indicate the scope or meaning of the embodiments or any of the claims that follow. Moreover, while representative embodiments have been illustrated and described in detail herein, the same is to be considered as illustrative and not restrictive in character, it being understood that only selected embodiments have been described, and that all changes, variations, modifications, undescribed embodiments, and equivalents that come within the spirit of the invention(s) as defined herein and/or by any of the following claims are desired to be protected.

What is claimed is:

1. A system, comprising:
a vehicle with a windshield having a curved portion;
a light passage control medium extending along at least the curved portion of the windshield, the light passage control medium being controllable to change opacity between a more transparent state and a more opaque state;
a first detector to sense position of a light source external to the windshield;
an operator control responsive to input from an operator of the vehicle;
a second detector to sense location of one or more eyes of the operator; and
a processing device responsive to the first detector and the second detector to determine one or more spots along the light passage control medium in accordance with operating logic, the processing device providing one or more signals to the light passage control medium to adjust the one or more spots from the more transparent state to the more opaque state to reduce passage of light from the light source to the one or more eyes of the operator; the processing device being responsive to the input from the operator with the operator control to adjust position of the one or more spots.

2. The system of claim 1, in which the processing device includes means for mapping location of the one or more spots along a matrix as a function of the position of the light source, the location of the one or more eyes of the operator, and the curved portion of the windshield.

3. The system of claim 1, further comprising a helmet worn by the operator, the windshield being attached to the helmet.

4. The system of claim 1, in which the processing device includes location shift logic to shift the location of the one or more spots from a first location to a second location in response to change in the position of the light source relative to the windshield.

5. The system of claim 1, in which the processing device includes:
size shift logic to shift size of the one or more spots from a first size to a second size in response to the input from the operator control; and
location change logic to change location of the one or more spots from a first location to a second location in response to another input from the operator control.

6. The system of claim 1, in which the light source includes one or more headlamps of another vehicle and the processing device is responsive to change of position of the one or more headlamps relative to the windshield to shift location of the one or more spots.

7. The system of claim 1, wherein the vehicle is an aircraft.

8. A method, comprising:
operating a vehicle with a windshield, a light passage control medium extending along at least a portion of the windshield, the light passage control medium being adjustable between a more opaque state and a more transparent state;
sensing position of a light source external to the windshield with a detector;
determining one or more locations on the light passage control medium corresponding to the position of a light source external to the windshield;
in response to input from an operator control device, changing position of the one or more locations to one or more other locations;
based on the input with the operator input device, adjusting the one or more locations from the more opaque state to the more transparent state and the one or more other locations from the more transparent state to the more opaque state;
performing the determining of the one or more locations with a processing device, the detector and the operator input device being operatively connected to the processing device;
responding to the input from the operator control device with the processing device to at least partially determine the one or more other locations; and
in which the light passage control medium includes a liquid crystal matrix coupled to the processing device, the liquid crystal matrix being responsive to signals from the processing device to change opacity of the one or more locations and the one or more other locations, the windshield includes a curved portion, the liquid crystal matrix at least partially extends along the curved portion, and the light source is the sun, and an operator of the vehicle: wearing a helmet with the windshield attached thereto.

9. The method of claim 8, which includes:
sensing position of one or more eyes of an operator of the vehicle; and
changing the one or more other locations from the more opaque state to the more transparent state and one or more different locations from the more transparent state to the more opaque state in accordance with the position of the light source and the position of the one or more eyes of the operator.

10. The method of claim 8, in which the operating of the vehicle includes flying an aircraft form of the vehicle, and the windshield is comprised of two or more panels, each of the panels being fixed next to at least one other of the panels with a corresponding divider connected therebetween, the two or more panels defining an exterior windshield surface extending away from an interior of the aircraft, and the light passage control medium being laminated to at least two of the panels of the windshield.

11. A method, comprising:
operating a vehicle with a windshield at least a portion of which has a curvature, a light passage control medium extending along at least a portion of the curvature of the windshield, the light passage control medium being adjustable between a more opaque state and a more transparent state;
sensing position of a light source external to the windshield with a detector;
selectively determining one or more locations on the light passage control medium in accordance with the position of the light source and one or more vehicle occupants;

in response to the determining of the one or more locations, selectively adjusting the light passage control medium to the more opaque state to reduce light passage from the light source through the one or more locations while one or more other portions of the light passage control device are in the more transparent state; and in which the light passage control device includes a liquid crystal matrix, the light source is the sun, and the vehicle is a type of aircraft.

12. The method of claim 11, in which the light source includes at least one headlamp of another vehicle, and the selectively determining of the one or more locations is at least partially performed with a processing device, the processing device being operatively coupled to the detector.

13. The method of claim 11, which includes: responding to movement of the light source relative to the windshield by changing the one or more locations to the more transparent state and one or more different locations from the more transparent state to the more opaque state.

14. The method of claim 11, which includes reacting to input from an operator control by changing the one or more locations to the more transparent state and one or more different locations from the more transparent state to the more opaque state.

15. The method of claim 14, which includes shifting the one or more different locations from a first size to a second size in response to another input from the operator control.

16. The method of claim 11, which includes:

sensing a locus of a different light source with the detector external to the windshield;

forming one or more spots along the light passage control medium by changing the one or more spots from the more transparent state to the more opaque state in accordance with the locus of the different light source, while one or more other portions of the windshield remain in the more transparent state.

* * * * *